United States Patent [19]

Triquet

[11] E Patent Number: Re. 33,701

[45] Reissued Date of Patent: Sep. 24, 1991

[54] STEERING COLUMN BOOT

[75] Inventor: Fred Triquet, Paw Paw, Mich.

[73] Assignee: Arco Industries Corporation, Schoolcraft, Mich.

[21] Appl. No.: 530,118

[22] Filed: May 29, 1990

Related U.S. Patent Documents

Reissue of:

[64] Patent No.: 4,826,466
Issued: May 2, 1989
Appl. No.: 198,601
Filed: May 2, 1988

U.S. Applications:

[63] Continuation-in-part of Ser. No. 95,570, Sep. 11, 1987, abandoned.

[51] Int. Cl.[5] ..... F16D 3/84; B62D 1/16

[52] U.S. Cl. ..... 464/173; 74/492; 277/212 FB; 403/50; 464/175

[58] Field of Search ..... 74/18, 18.1, 18.2, 492; 464/173, 175; 277/212 R, 212 C, 212 F, 212 FB, 153; 180/78; 285/23, 266; 138/119; 403/50, 51

[56] References Cited

U.S. PATENT DOCUMENTS

| | | | |
|---|---|---|---|
| 1,959,259 | 5/1934 | Zerk | 74/18 |
| 2,362,456 | 11/1944 | Alden | 74/18.1 |
| 2,687,015 | 8/1954 | Edwards | 74/18.2 |
| 2,702,996 | 3/1955 | Davis | 74/18.1 |
| 3,373,629 | 3/1968 | Wight et al. | 74/492 |
| 3,403,932 | 10/1968 | Kutcher | 277/212 FB |
| 3,470,761 | 10/1969 | Okamoto et al. | 74/492 |
| 3,511,061 | 5/1970 | Burckhardt | 277/212 FB |
| 3,901,518 | 8/1975 | Uchida | 277/212 FB |
| 3,995,502 | 12/1976 | Jones | 74/18.2 |
| 4,208,060 | 6/1980 | St. Laurent | 74/18.2 |
| 4,267,743 | 5/1981 | Tanaka | 74/493 |
| 4,270,442 | 6/1981 | Bainard et al. | 74/18.2 |
| 4,305,595 | 12/1981 | Miyagishima et al. | 277/152 |
| 4,461,529 | 7/1984 | Fariss | 439/604 |
| 4,556,399 | 12/1985 | Billet et al. | 277/212 FB |
| 4,597,745 | 7/1986 | Orian | 277/212 FB |

FOREIGN PATENT DOCUMENTS

| | | | |
|---|---|---|---|
| 1342949 | 10/1963 | France | 277/212 FB |
| 1144475 | 3/1969 | United Kingdom | 277/212 FB |
| 1239228 | 7/1971 | United Kingdom | 277/212 FB |
| 2022770 | 12/1979 | United Kingdom | 277/212 C |

*Primary Examiner*—Allan D. Herrmann
*Attorney, Agent, or Firm*—Reising, Ethington, Barnard, Perry & Milton

[57] ABSTRACT

A resilient boot assembly (10) of the type for containing a steering shaft (22) therein includes a tubular body portion (12) having a passageway (14) extending therethrough and first and second end portions (16,18). One end of the boot is adapted to attach to a steering gear housing (20). The assembly (10) is a unitary tubular member and includes at least one end having a resilient portion (24) and stiffened portions (26,28) at each end of the resilient portion for providing the flexible resilient portion (24) to roll up upon the body portion (12) to a retracted position to expose the connection between the steering shaft (22) and steering gear assembly and rolling down to an extended position to contain and perfect a seal with the steering gear housing (20).

8 Claims, 3 Drawing Sheets

STEERING COLUMN BOOT

Matter enclosed in heavy brackets [ ] appears in the original patent but forms no part of this reissue specification; matter printed in italics indicates the additions made by reissue.

This application is a continuation-in-part of Ser. No. 095,570, filed Sept. 11, 1987, now abandoned.

TECHNICAL FIELD

The present invention relates to a resilient boot assembly of the type for containing a steering column therein, a method of manufacturing and assembling such a boot assembly, and to a vehicle including the resilient boot assembly. More particularly, the invention relates to a boot assembly for containing a portion of a steering column extending through a fire wall in a vehicle body and a portion of the steering column connected to the steering gear assembly.

BACKGROUND ART

In order to prevent corrosion and damage to a steering column caused by corrosive materials found on the road, such as dirt, stones, and salt, it is common for a resilient boot to be disposed over the steering column which extends through a fire wall in a vehicle. *Such boots are also used to prevent air, rain sound and fumes from entering the passenger compartment.* The U.S. Pat. Nos. 1,803,013 to Grimm, issued Apr. 28, 1931; 3,470,761 to Okamoto et al, issued Oct. 7, 1969; 4,267,743 to Tanaka, issued May 19, 1981; 3,373,629 to Wight et al, issued Mar. 19, 1968; and 2,797,955 to Wilfert, issued July 2, 1957, all disclose steering column boot assemblies or seals. It is desirable during the assembly of the steering column to the steering gear assembly of the vehicle to be able to expose the connection between the steering column and steering gear assembly for operative connection. None of the prior art patents previously mentioned provide any means for allowing access to the connection.

Applicant presently manufactures a resilient two part boot assembly including a first member containing the steering column and a separate piece which telescopically slides up upon the first member thereby allowing access to the connection between the steering column and the steering gear. The two parts are normally connected by an interference fit. Although this prior art assembly allows for access to the connection between the steering column and steering gear assembly during assembly, the two boot construction allows leakage between the two boot parts. High winds or water can enter the interference fit connection. Alignment of the two boot parts is also a complication inherent in the assembly. There are further assembly and manufacturing problems attendant to the making of the two part boots wherein each part is made separately.

The present invention eliminates or alleviates the aforementioned problems of the prior art while continuing to allow access to the connection between the steering column and steering gear assembly.

SUMMARY OF THE INVENTION

A resilient boot assembly of the type for containing a steering column therein includes a tubular body portion having a passageway extending therethrough and first and second end portions. Attachment means attaches at least one of the ends of the body portion to a support structure. The assembly is a unitary tubular member and includes roll up means for rolling up at least one of the end portions upon the body portion to a retracted position and rolling down the one end portion to an extended position.

FIGURES IN THE DRAWINGS

Other advantages of the present invention will be readily appreciated as the same becomes better understood by reference to the following detailed description when considered in connection with the accompanying drawings wherein.

DETAILED DESCRIPTION OF THE DRAWINGS

Figure 1:
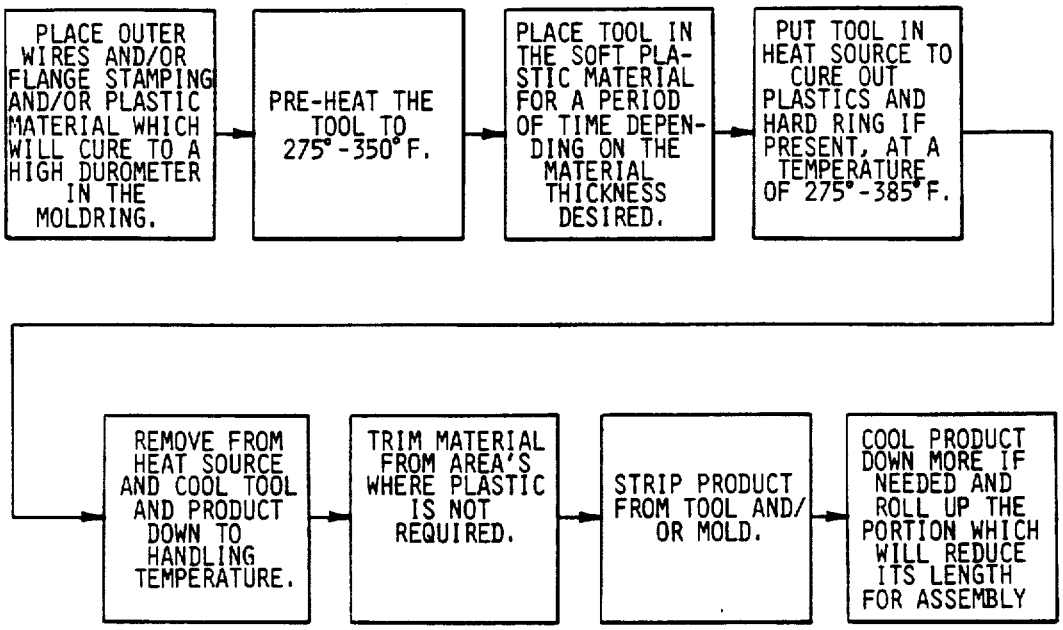
FIG. 1 is a schematic flow diagram of the subject method of manufacturing.

A resilient boot assembly constructed in accordance with the present invention is generally shown at 10 in the drawings. The boot 10 includes a tubular body portion generally indicated at 12 having a passageway 14 extending therethrough. The body portion 12 further includes first and second end portions generally indicated at 16 and 18.

The end portion 18 is adapted to be connected to the steering column and perfect a seal therewith. The other end portion 16 is adapted to be connected to the steering gear assembly schematically indicated at 20 in FIG. 2.

Figure 2:
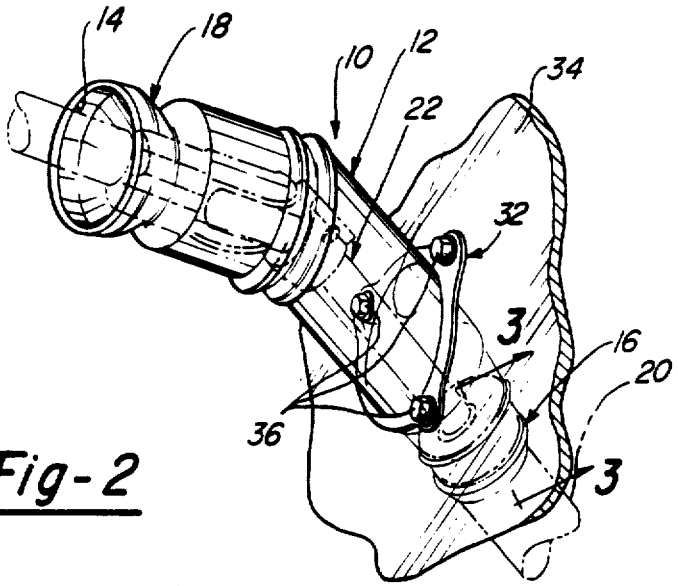
FIG. 2 is a perspective view of a vehicle steering column including the steering column boot of the present invention.

FIG. 2 shows a portion of a vehicle constructed in accordance with the present invention. The vehicle could be in the form of an automobile, truck or other type of vehicle. The portion shown is the steering column. The steering gear housing contains the steering gear assembly (not shown).

Generally, the boot assembly 10 is a unitary tubular member and including roll up means for rolling up the end portion 16 upon the body portion 12 to a retracted position to expose the connection between the steering shaft generally 15 indicated at 22, and the steering gear housing schematically shown at 20. The roll up means further rolls down the end portion 16 to an extended position thereby containing and perfecting a seal with the steering gear housing 20 and about the connection between the steering shaft 22 and steering gear assembly 20.

More specifically, the roll up means includes an annular flexible portion 24 which is adjacent the end portion 16. The end portion 16 further includes stiffened portions 26,28 adjacent each end of the flexible portion 24.

Figure 3:
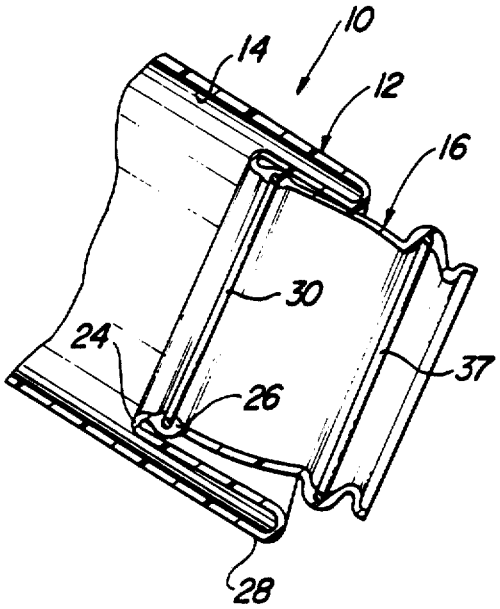
FIG. 3 is a fragmentary cross sectional view taken across lines 3—3 of FIG. 2 showing the steering column boot in the retracted position.
Figure 4:
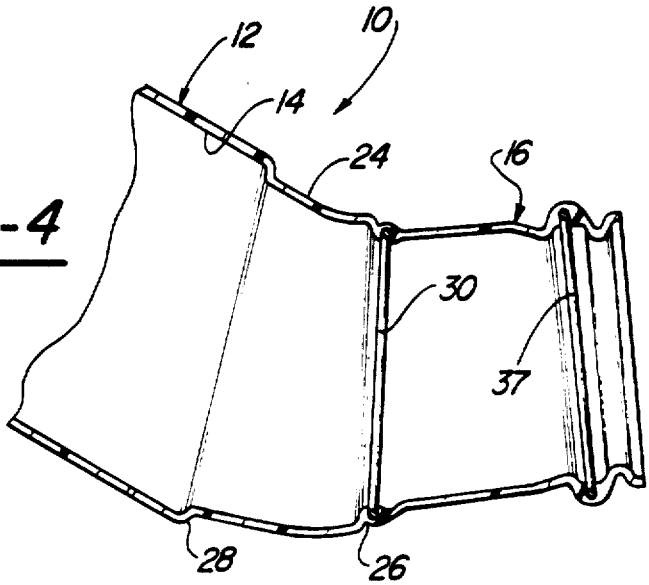
FIG. 4 is a cross sectional view showing the steering column boot in the extended position.
Figure 6:
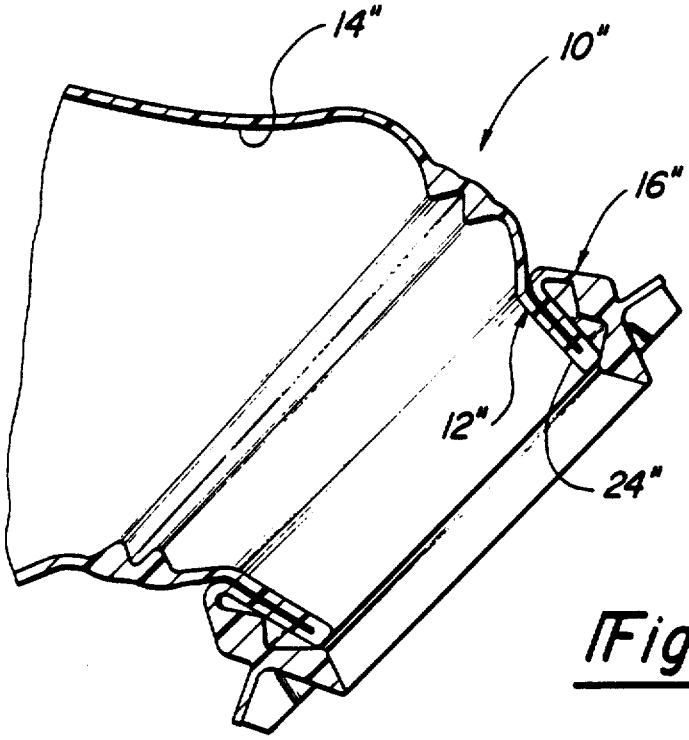
FIG. 6 is a cross sectional view of a third embodiment of the present invention in the retracted position.
Figure 7:
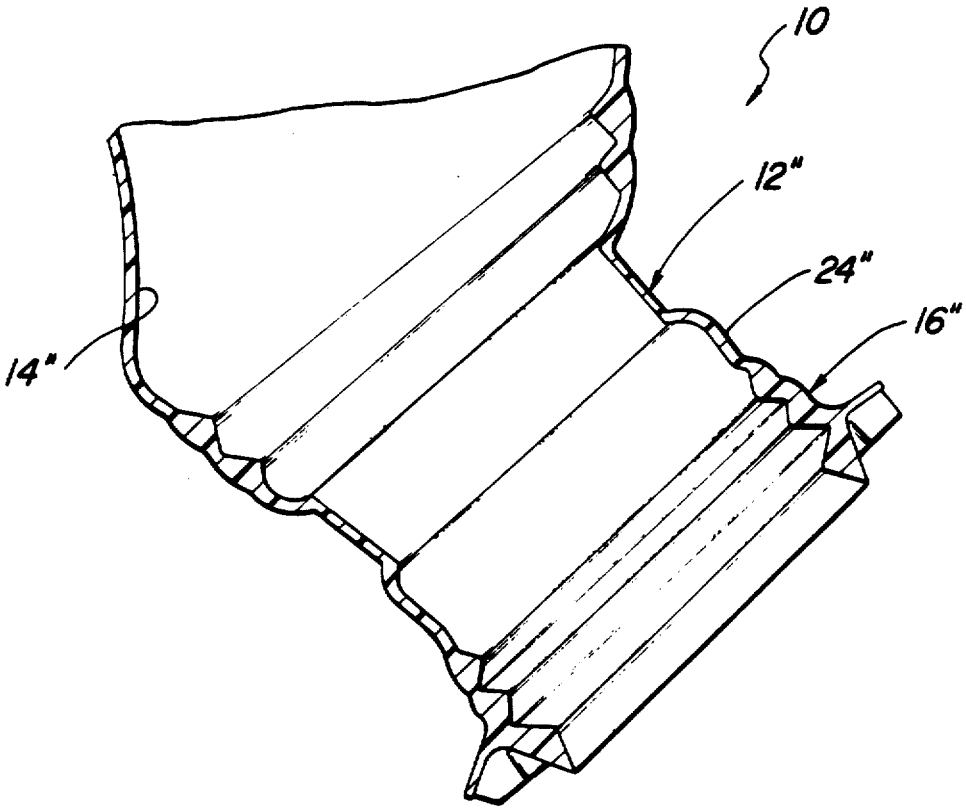
FIG. 7 is a cross sectional view of the third embodiment in the extended position.

As shown in FIGS. 3 and 4, the flexible portion has a predetermined outer diameter and the body portion has an inner diameter which is greater than the predetermined outer diameter of the portion 24. The combination of the flexible portion 24 having the smaller outer diameter and the stiffened portions 26,28 bordering the flexible portion 24 together with the body portion having the relatively larger inner diameter allows for the end portion 16 to telescopically roll up inside the body portion 12 into the retracted position for attachment of the steering shaft 22 to the steering gear assembly. Alternatively, as shown in FIGS. 6 and 7 the body portion 12 could have a smaller outer diameter relative to the inner diameter of the flexible portion 24 such that the outer end portion folds over the body portion 14.

Figure 5:
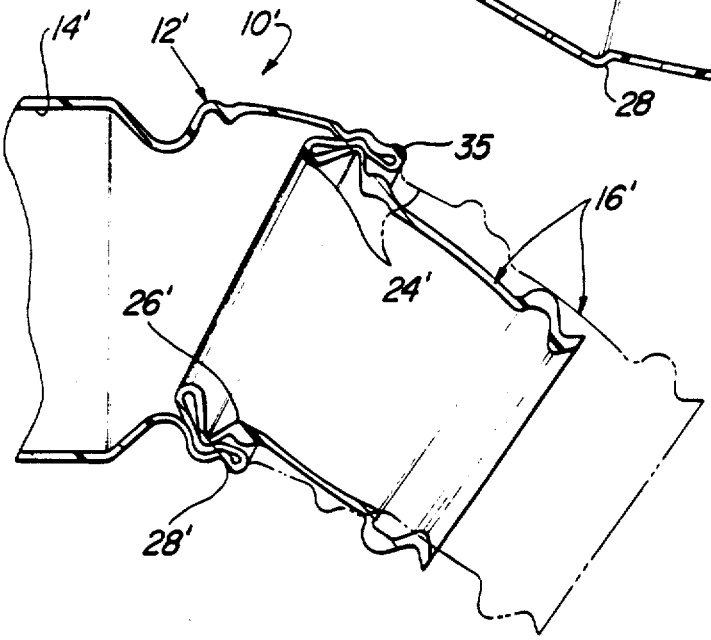
FIG. 5 is a cross sectional view of a second embodiment of the present invention.

The stiffened portions 26,28 can be stiffened by various means relative to the flexible portion 24. For example, as shown in FIGS. 3 and 4, the stiffened portions can be stiffened by the use of wires imbedded in the end portion wall adjacent the flexible portion 24. Alternatively, as shown in FIG. 5 wherein like structure is indicated by primed numbers, the stiffened portions 26' may be a thickened annular bead portion relative to the flexible portion 24' or the stiffened portion may include a harder material. For example, the flexible portion could be made from a vinyl plastisol which is approximately 50 to 70 durometer on the A scale when cured and the stiffened portion can be made from a vinyl plastisol which is approximately [50] *60* to [70] *75* durometer on the [B] *D* scale.

As shown in FIG. 2, a foam gasket generally indicated at 32 is integrally formed with the body portion 12. The gasket can be made from a restricted cell urethane. The gasket provides means for connecting the body portion 12 of the boot assembly 10 to a fire wall 34 by means of bolts 36.

The present invention provides a one piece boot assembly which eliminates or alleviates problems of alignment and leakage. Since the boot is a unitary structure, there is no longer the problem of leakage from between two part boot assemblies. The ability of the boot to be folded in upon itself and the flexibility of the end portion 16 assists in alignment of the boot and fitting of the boot to a particular steering column construction. Manufacturing efficiency is increased because what was formally two parts is now a single part.

During assembly, the boot assembly 10 is fixedly connected *in the retracted position as shown in FIG. 3 and in solid lines in FIG. 5* to the fire wall 34 by the [bolts] *fasteners* 36 connecting the gaskets 32 to the fire wall 34. The steering shaft 22 is then disposed through the passageway 14 of the boot 12 and positioned to connect a connecting portion of the steering shaft 22 to the connecting portion of the steering gear assembly within the housing 20. [The end portion 16,16' is then moved to the retracted position as shown in FIG. 3 and in solid lines in FIG. 5 to expose the connecting portions of the steering shaft 22 and the steering gear assembly.] Upon operative connection of the steering shaft 22 to the steering gear assembly, the end portion 16,16' is rolled down to the extended position shown in FIG. 4 and in hatched lines in FIG. 5. The end portion 16 is then connected to the steering gear housing 20 to perfect a seal therewith. Thusly, the vehicle includes a steering column and gear connection totally contained within the boot assembly 10 and protected against environmental corrosion.

The present invention further provides a method of manufacturing the boot assembly 10. The method generally includes the steps of molding the unitary resilient boot 10 including the tubular body portion 12, and end portion 16 including two stiffened portions 26,28 and a more resilient portion 24 therebetween on tool, and removing the molded boot 10 from the tool. More specifically, and as shown in the flow diagram in FIG. 1, the stiffening portions of the boot assembly 10 are placed on a mold ring of a tool. The stiffened portions can be either the stiffening wires 33, the flange stamping and/or other harder plastic materials of the boot, or further stiffening wires 37,37' which stiffen other portions of the boot assembly 10. Alternatively, a partially cured harder plastic material which cures at a higher temperature to high durometer in the molding process can also be disposed on the tool. The tool is then preheated to between 275° and 350° F. The tool is dipped in a [pot] *tank* of soft plastic material for a period of time. The heated tool partially cures and adheres the adjacent soft plastisol to the tool during the dipping process. The exposure time of the tool within the [pot] *tank* is dependent upon the amount of material and end thickness of the boot desired. The longer the tool is dipped in the [pot] *tank*, the thicker the material will be disposed on the tool. The tool is then removed from the [pot] *tank* and placed in a heat source to cure out all of the plastics, at a temperature of approximately 275° F. This temperature finally cures the soft plastisol, as well as the harder plastisol areas. The tool is then removed from the heat source and cooled down to handling temperature. The boot is then trimmed of material where plastic is not required. The boot is stripped from the tool and cooled down to ambient temperature if needed. The end portion of the boot is then rolled up to reduce its length for shipping and handling.

Alternatively, both ends 16,18 can be manufactured to roll up, depending upon the desired use of the boot assembly 10,10' in assembly.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

What is claimed is:

1. A resilient boot assembly (10) of the type for containing a steering shaft (22) therein, said assembly (10) comprising; a tubular body portion (12) including a passageway (14) extending therethrough and first and second end portions (16,18), and attachment means for attaching at least one of said end portion (16) of said body portion (12) to a support structure (20), characterized by a said assembly (10) being a unitary tubular member and including roll-up means for rolling up and maintaining at least one of said end portions (16) upon said body portion (12) from an extended position defining a first axial length of said assembly (10) to a retracted seated position defining a second shorter axial length of said assembly (10) and rolling down said one end portion (16) to said extended position.

2. An assembly as set forth in claim 1 further characterized by said rolling up means including an annular flexible portion (24) adjacent one of said end portions (16) and a stiffened portion (26,28) adjacent each end of said flexible portion (24), one of either *of* said flexible portions (24) and said body portion (12) having a predetermined outer diameter and the other of said flexible portion (24) and body portion (12) having a predetermined inner diameter greater than said predetermined outer diameter.

3. An assembly as set forth in claim 2 further characterized by said body portion (12) having a predetermined wall thickness, said flexible portion (24) having a predetermined thickness which is less than said wall thickness of said body portion.

4. An assembly as set forth in claim 2 further characterized by said body portion (12) comprising a [plastisol] *plastic* material having a predetermined hardness, said flexible portion (24) comprising a [plastisol] *plastic* material having a predetermined hardness which is less than said predetermined hardness of said [plastisol] *plastic* material of said body portion (12).

5. An assembly as set forth in claim 2 further characterized by said stiffened portions including at least one annular metallic ring member embedded in said tubular member (12) on each side of and adjacent to said flexible portions (24).

6. An assembly as set forth in claim 2 further characterized by said stiffened portions (26,28) including at least one annular bead (35,37) on each side of and adjacent to said flexible portion (24).

7. An assembly as set forth in claim 2 further characterized by said inner diameter of said body portion (12) being greater than said outer diameter of said flexible portion (24) so that said flexible portion (24) telescopes into said body portion (12).

8. An assembly as set forth in claim 2 further characterized by said inner diameter of said flexible portion (24') being greater than said outer diameter of said body portion (12') so that said flexible portion (24') telescopes over said body portion (12').

* * * * *